United States Patent
Johnson et al.

(10) Patent No.: US 6,744,035 B2
(45) Date of Patent: Jun. 1, 2004

(54) PASSIVE, TEMPERATURE COMPENSATED TECHNIQUES FOR TUNABLE FILTER CALIBRATION IN BRAGG-GRATING INTERROGATION SYSTEMS

(75) Inventors: Gregg A. Johnson, Fairfax, VA (US); Bryan L. Althouse, Annapolis, MD (US); Greg Nau, Alexandria, VA (US); Sandeep T. Vohra, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 57 days.

(21) Appl. No.: 10/346,069

(22) Filed: Jan. 17, 2003

(65) Prior Publication Data

US 2003/0218124 A1 Nov. 27, 2003

Related U.S. Application Data

(63) Continuation of application No. 09/635,227, filed on Aug. 9, 2000, now Pat. No. 6,573,489.

(51) Int. Cl.[7] ................................................ G01B 9/02
(52) U.S. Cl. ............................ 250/227.14; 250/227.19; 385/12
(58) Field of Search ..................... 250/227.14, 227.19, 250/227.11, 227.18, 227.23, 227.26, 227.27; 385/10, 12, 24, 37; 356/32

(56) References Cited

U.S. PATENT DOCUMENTS

| | | | | |
|---|---|---|---|---|
| 6,118,914 A | * | 9/2000 | Davis et al. | 385/37 |
| 6,310,703 B1 | * | 10/2001 | Alavie et al. | 359/110 |
| 6,421,120 B1 | * | 7/2002 | Wildnauer | 356/243.1 |
| 6,437,326 B1 | * | 8/2002 | Yamate et al. | 250/269.1 |

* cited by examiner

*Primary Examiner*—Frank G. Font
*Assistant Examiner*—Michael P. Mooney
(74) *Attorney, Agent, or Firm*—John J. Karasek; John Gladstone Mills, III

(57) ABSTRACT

A passive, temperature compensated tunable filter calibration device in a Bragg-grating interrogation system. The invention comprises two systems: 1) a dual substrate Bragg grating calibration system, the temperature of an array of gratings is estimated using an array of gratings bonded to a common host substrate and a single grating bonded to a material with a different coefficient of thermal expansion; 2) a hydrogen cyanide wavelength reference absorption cell that absorbs light at discrete wavelengths corresponding to the molecular vibration mode frequencies of the gas. A first photodetector sees the transmission spectrum and a second sees the reflections from Bragg gratings in a sensing array. In this system there is no temperature compensation step as the absorption lines are not sensitive to temperature.

4 Claims, 4 Drawing Sheets

PASSIVE, TEMPERATURE COMPENSATED TECHNIQUES FOR TUNABLE FILTER CALIBRATION IN BRAGG-GRATING INTERROGATION SYSTEMS

This is a continuation of Ser. No. 09/635,227 filed Aug. 9, 2000, now U.S. Pat. No. 6,573,489.

BACKGROUND OF THE INVENTION

1. Field of the Invention

Generally this invention pertains to a wavelength reference and calibration device, and more specifically to a fiber Bragg grating interrogation system for determination of Bragg grating wavelengths.

2. Description of the Related Art

There is a need for accurate measurement of Bragg gratings wavelengths that includes long-term and static strain monitoring on structures and determination of wavelengths in optical communications systems. There a number of systems that use the wavelength of fiber Bragg gratings to indicate the value of a measurand such as strain or temperature often at distributed points on a structure. In systems of multiple Bragg gratings—especially in a single fiber—bandpass filters that scan through a range of wavelengths are commonly employed. (SEE, Kersey et al.; A MULTIPLEXED FIBER BRAGG STRAIN SENSOR SYSTEM WITH A FIBER FABRY-PEROT WAVELENGTH FILTER; Optics Lett., Vol/18, Pg. 1370, 1993.) In some schemes, the control signal applied to the filter is used to determine the wavelength of the individual gratings. This practice depends on an estimated functional relationship between the filter control input and the wavelength location of the passband, a function that is not in practice linear or constant in time. For dynamic measurements a one-time calibration is often adequate, while for very low frequency measurements a real-time calibration is necessary for accurate determination of Bragg grating wavelength. Current filter calibration options include wavelength references such as temperature-isolated gratings (SEE, U.S. Pat. No. 5,818,585) or the fringe pattern of a temperature-isolated Fabry-Perot cavity (SEE, U.S. Pat. No. 5,892,582). In either case, the reference wavelengths are sensitive to changes in temperature and care must be taken to keep the gratings or cavity at a constant temperature.

SUMMARY OF THE INVENTION

The object of this invention is to provide an interrogation system for fiber Bragg gratings enabling accurate determination of Bragg grating wavelengths that is compensated for changes in temperature, if required.

This and other objectives are met by a passive, temperature compensated tunable filter calibration device for Bragg grating interrogation having a set of reference wavelengths, enabling accurate determination of Bragg grating wavelengths. There are two devices, first is a system that estimates the temperature of an array of gratings using an array of gratings bonded to a common host substrate and a single grating bonded to a material with different linear coefficient of thermal expansion, this is called a dual-substrate Bragg grating calibration system. Changes in a common temperature of the subsstrates is measured by monitoring the difference betweeen shifts of grating wavelength. As a filter is scanned from its lowest to highest voltage and the voltages are recorded. The second lowest wavelength corresponds to the grating attached to the differing substrate. The voltages are used to calculate the voltage-to-wavelength function for the scanning range of the filter. To compensate for variations in a calibration curve and temperature variations of the calibration array, the temperature is estimated and function recalculated at every pass of the scanning filter.

The second system uses a wavelength reference absorption cell, preferably a hydrogen-cyanide ($H^{14}C^{13}N$) type of wavelength reference absorption cell, that absorbs light at discrete wavelengths corresponding to the molecular vibrational mode frequencies of the gas. A wavelength reference absorption cell utilizing acetylene may be used, however the hydrogen-cyanode cell has more lines across a bigger range. With a broadband input to the cell, the output displays the spectrum of the input with several narrow dips in the spectrum corresponding to the absorption lines. A photodetector sees the transmission spectrum of the absorption cell while another photodetector sees the Bragg gratings reflection from a sensing array. The filter drive voltages that coincide with the dips of the transmission spectrum are used to calibrate the voltage-to-wavelength function of the scanning filter. In this system, there is no temperature compensation step as the absorption lines are not sensitive to temperature.

DESCRIPTION OF THE PREFERRED EMBODIMENT

Figure 1A:
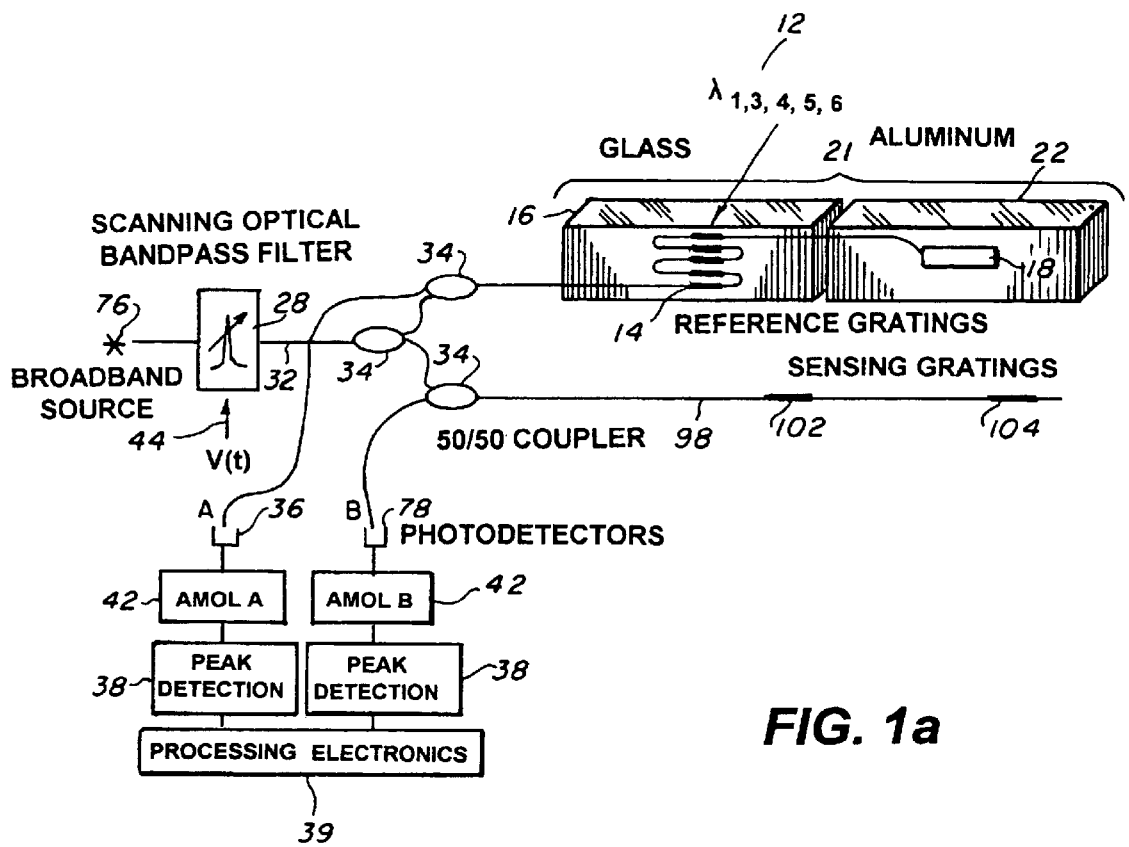
FIG. 1a shows a block diagram of a passive, temperature compensated device for a tunable filter calibration Bragg-grating utilizing a dual-substrate Bragg grating calibration system.

The first preferred embodiment of a passive, temperature compensated device for a tunable filter calibration Bragg-grating 10, as shown in FIG. 1, is an array 12 of at least six Bragg gratings 14, five Bragg-gratings 14 are bonded to a common host substrate 16, $\alpha_1$, such as glass, with a single grating 18 bonded to a substrate 22, $\alpha_2$, material, with a different linear coefficient of thermal expansion, such as aluminum ($\alpha$ representing the coefficient of expansion). The gratings 16 and 22 are reference gratings 21. The Bragg wavelength, $\lambda_B$, of an unbonded grating will vary with temperature due to changes in the index of refraction of a fiber core, $d_n$, and the expansion/contraction of the glass fiber itself according to $$\Delta\lambda_B = [(d\Lambda/dT)/\Lambda + (dn/dT)/n]\lambda_B \Delta T \qquad (1)$$

where $\Lambda$ is the period of the index-modulation of the fiber core, which creates the grating. The $(d\Lambda/dT)/\Lambda$ term is simply the thermal coefficient of linear expansion. For silica the dn/dT term dominates the thermal wavelength shift effect. When bonded to a substrate 16 or 22, the changes in length due to temperature can be amplified, where $(d\Lambda/dT)/\Lambda$ is replaced by the expansion coefficient of the substrate which can be much higher. By bonding two gratings 12 and 18 to two different substrates 16 and 22 with differing expansion coefficients, changes in the common temperature of the substrates 16 and 22 can be measured by monitoring the difference between shifts of the grating wavelengths according to $$\Delta T = (\Delta\lambda_{B1} - \Delta\lambda_{B2}) / \{\lambda_{B1}[\alpha_1 + (dn/dT)/n] - \lambda_{B2}[\alpha_2 + (dn/dT)/n]\} \quad (2)$$

when it is assumed that the coefficients of the substrates, $\alpha_1$ and $\alpha_2$, are well known, and the Bragg wavelengths are known prior to the change in temperature.

Equation (2) is used first to estimate the temperature of an array of the gratings 12 with the estimated temperature, the present wavelengths of the gratings 14 being estimated from $$\lambda_{Bi} = \lambda_{Bi}|_{T=T_0} + \lambda_{Bi}[\alpha_i + (dn/dT)/n](T - T_0) \quad (3)$$

where $T_0$ is the temperature at which $\lambda_{Bi}$ is initially measured, and i refers to the grating number.

Figure 1B:
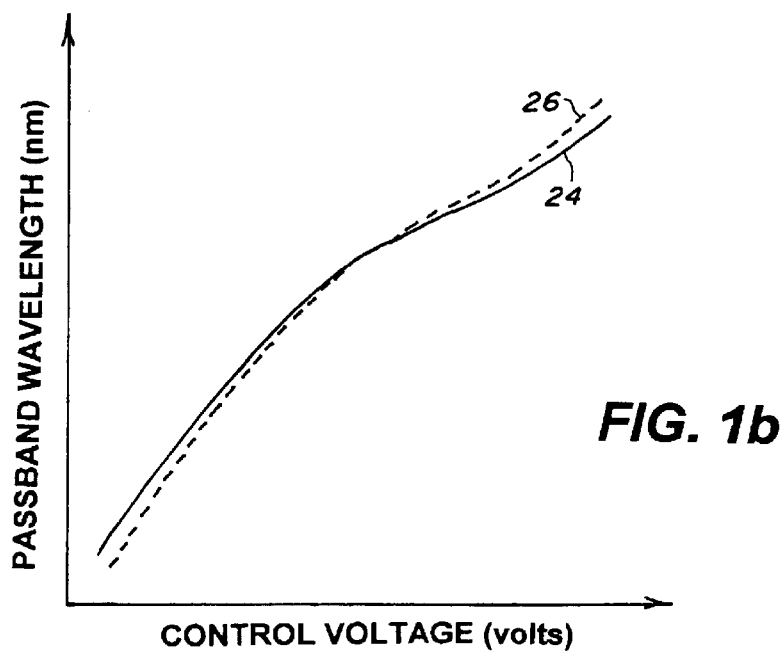
FIG. 1b shows a functional relationship between control voltag and passband center wavelength.

Wavelength-shift detection systems use scanning bandpass filters to measure grating wavelengths according to the control voltage applied to the filter at the same time the grating wavelength and passband wavelength coincide. The relationship between control voltage and passband center wavelength is typically nonlinear. For example, a scanning Fabry-Perot filter is often used in these applications. FIG. 1b illustrates the functional relationship between control voltage and passband center wavelength. Furthermore, the function often encounters a drift over even short time periods such that after several minutes the curve may shift from the solid line 24 to the dotted line 26. In this case, a continuously updated calibration curve is necessary to ensure an accurate wavelength-to-voltage mapping that is needed for wavelength-shift accuracy as well as low frequency, absolute wavelength monitoring.

The scanning filter 28 filters a broadband source of optical light 32 generated by an optical light source 76 so that at any point in time only a narrow band of light is present in the grating-containing fibers 32 that are connected to the output of the filter 28 through 50/50 couplers 34. In this embodiment light is only returned to photodetectors A 36 and B 78 when the passband is scanned through the wavelength of a grating 14 or 18, and the gratings 14 and 18 reflects back through the coupler 34 to the detector 38 then amplified in an associated amplifier 42. The amplified photodetector signal 37 results in a series of peaks that correspond to the gratings 14 0r 18 in the arrays 12 and 22 from the lowest wavelength to highest as the drive voltage 44, V(t), is increased. In this embodiment 10, one grating array 12 contains the calibration and reference device 16 and 22, while the other array 98 is considered an array of sensing gratings 102 and 104. The sensing grating, for example, may be bonded to a bridge girder. To know the Bragg wavelength of these gratings it is necessary for the calibration/reference device have a high accuracy.

Figure 1C:
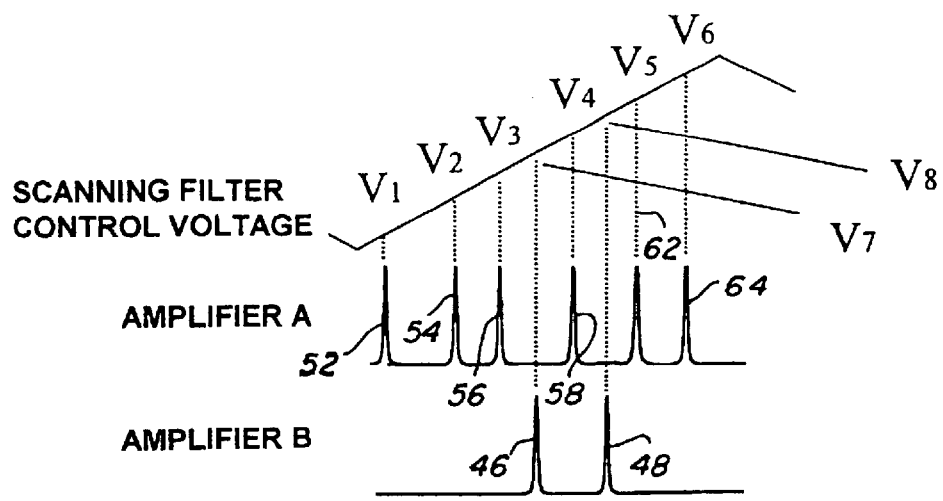
FIG. 1c shows the voltage peaks present in the amplifiers indicating Bragg gratings at different scanning voltage values.
Figure 1D:
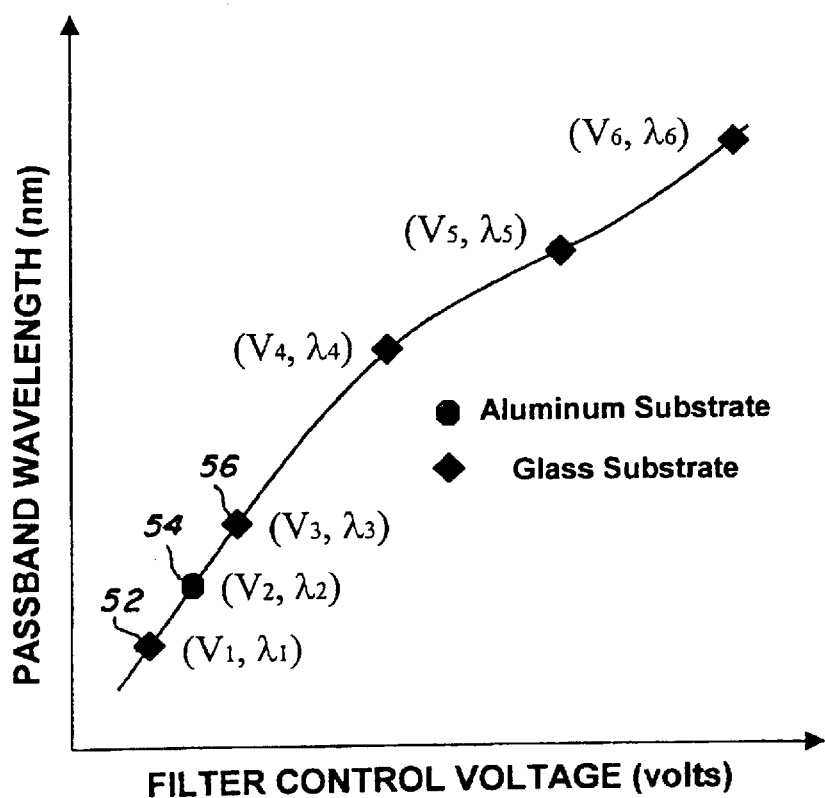
FIG. 1d shows passband wavelength (nm) as constructed from the filter control voltage at known wavelengths of Bragg gratings on a glass and aluminum substrate.

The following steps are used in the first preferred embodiment 10 to determine the reference wavelengths and the scanning filter calibration curve and finally the wavelengths of the sensing Bragg gratings 102 and 104. As the filter voltage 44 is scanned from its lowest to highest voltage, the voltages at which the reference gratings 21 are encountered, $V_1$ 52–$V_2$ 54 are recorded, as shown in FIG. 1c. $V_7$ 46 and $V_8$ 48 denote the voltages at which the sensing gratings 102 and 104 are encountered. The $2^{nd}$ lowest wavelength, $\lambda_2$, corresponds to the grating 18 which is attached to a substrate 22 different from the rest of the reference grating 14. In this example this grating 18 is bonded to an aluminum strip while the other gratings 14 are bonded to a glass slide. When the temperature of the substrates 16 and 22 change together (they are in thermal contact) the aluminum-bonded grating 18 sees more expansion and compression than the glass-bonded gratings 14, Correspondingly, the ratio $$R = (V_2 - V_1)/(V_3 - V_1) \quad (4)$$

increases as temperature T increases. If the lowest three Bragg wavelength, $\lambda_1$ 52 through $\lambda_3$ 56 are chosen to be within a few nanometers of each other, as shown in FIG. 1d, R is well approximated to be linear and is independent of the peak-to-peak amplitude of the filter drive voltage 44. R is typically measured directly by placing the reference device 14 and 18 in an environmental chamber and recording R as T is varied through a wide range. With this calibration curve, T can be approximated by calculation of R with every sweep of the filter 48. Once T is acquired the glass-bonded and aluminum-bonded gratings 14 and 18, respectively, wavelengths are calculated from Equation (3) to obtain $\lambda_1$ through $\lambda_6$. At this point the voltages $V_1$ 52 through $V_6$ 64 are used with the $\lambda$'s to calculate the voltage-to-wavelength function for the scanning range of the filter 28. For scanning Fabry-Perot filters 28, the function is well approximated by a $3^{rd}$ order polynominal. With the function estimated, the wavelength of the sensor gratings $\lambda_7$ 102 and $\lambda_8$ 104 in FIG. 1a, are calculated from the voltages $V_7$ 46 and $V_8$ 48. To compensate for variations in the calibration curve and temperature variations of the calibration array, the temperature is estimated and the function recalculated at every pass of the scanning filter 28 by the associated processing electronics 39.

Figure 2A:
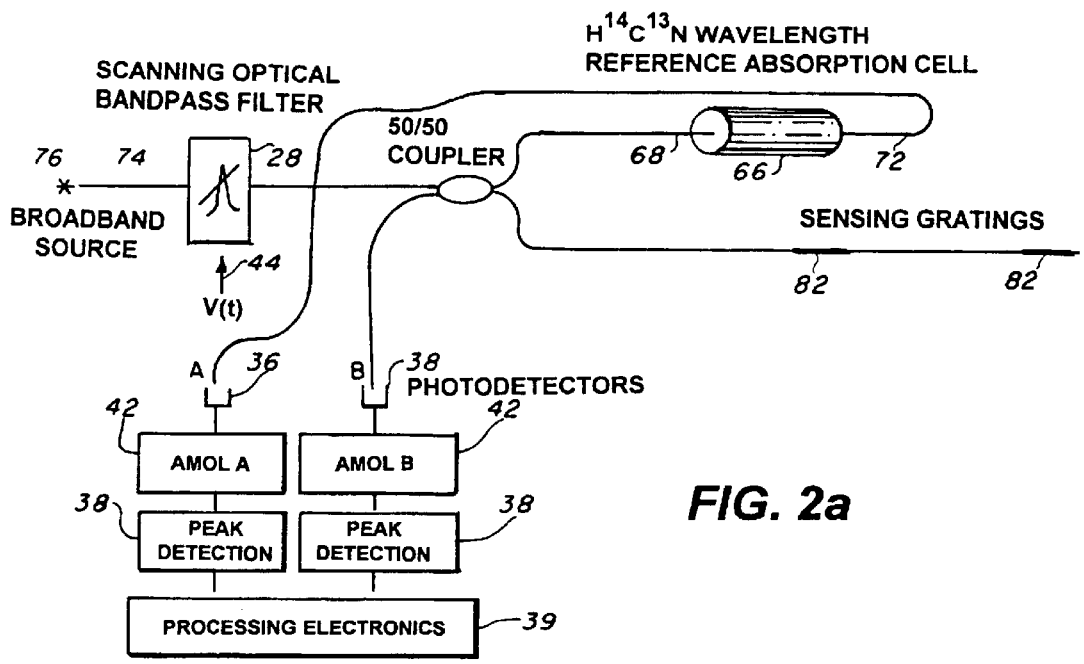
FIG. 2a shows a block diagram of a Bragg grating interrogation system for a tunable filter calibration utilizing a hydrogen-cyanide wavelength reference absorption cell.
Figure 2B:
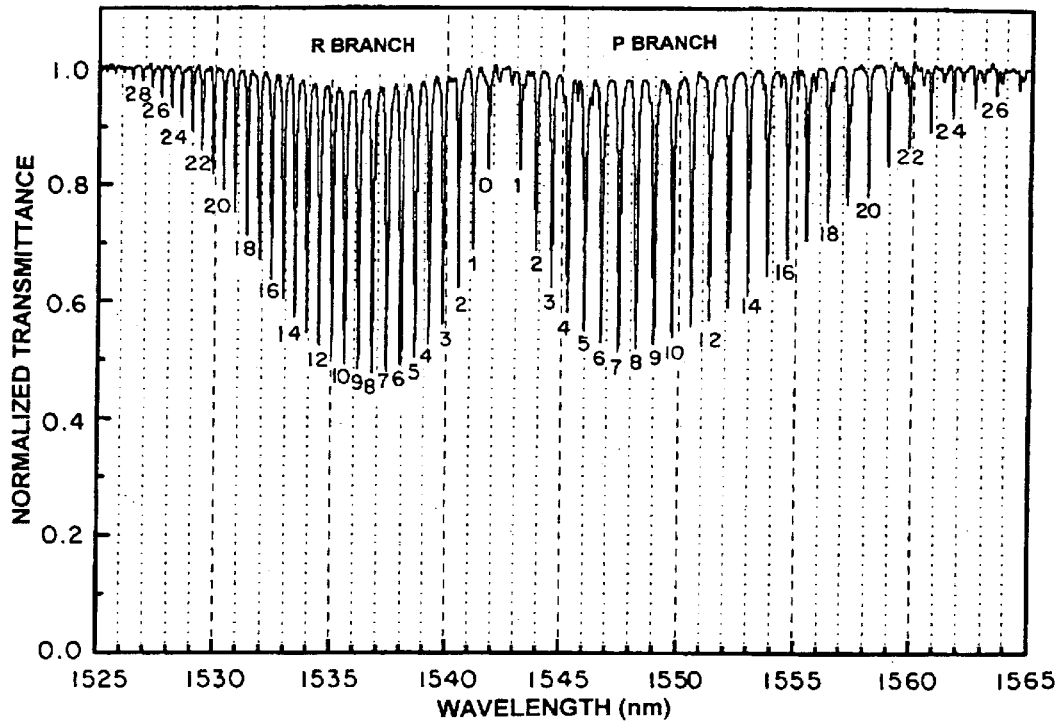
FIG. 2b shows a normalized transmission spectrum.

In a second preferred embodiment 20, as shown in FIG. 2a, a hydrogen-cyanide ($H^{14}C^{13}N$) wavelength reference absorption cell 66 is used. The gas is held in a pressurized cylinder with a fiber optic input 68 and output 72. The cell 66 absorbs light at discrete wavelengths corresponding to the molecular vibrational mode frequencies of the gas. With a broadband optical light 74, from a broadband optical light source 78, input to the cell 66 in the range of 1525 to 1565 nm wavelengths, the output 72 displays the spectrum of the input 68 with several narrow dips in the spectra corresponding to the absorption lines. The normalized transmission spectrum is shown in FIG. 2b. Twenty-one of the lines have a center wavelength uncertainty of less than +/−0.0006 nm. Extreme variations in temperature (+/−100K) only shift the wavelengths by $8.0 \times 10^{-6}$ nm, hence for most applications, the lines may be assumed to be stationary with changes in temperature, The gas cells 66 are commercially available from such source as a HCN Optical Cell manufactured by Technical Glass, Inc. of Aurora, Colo., and are fiber-pigtailed by the vendor.

Figure 2C:
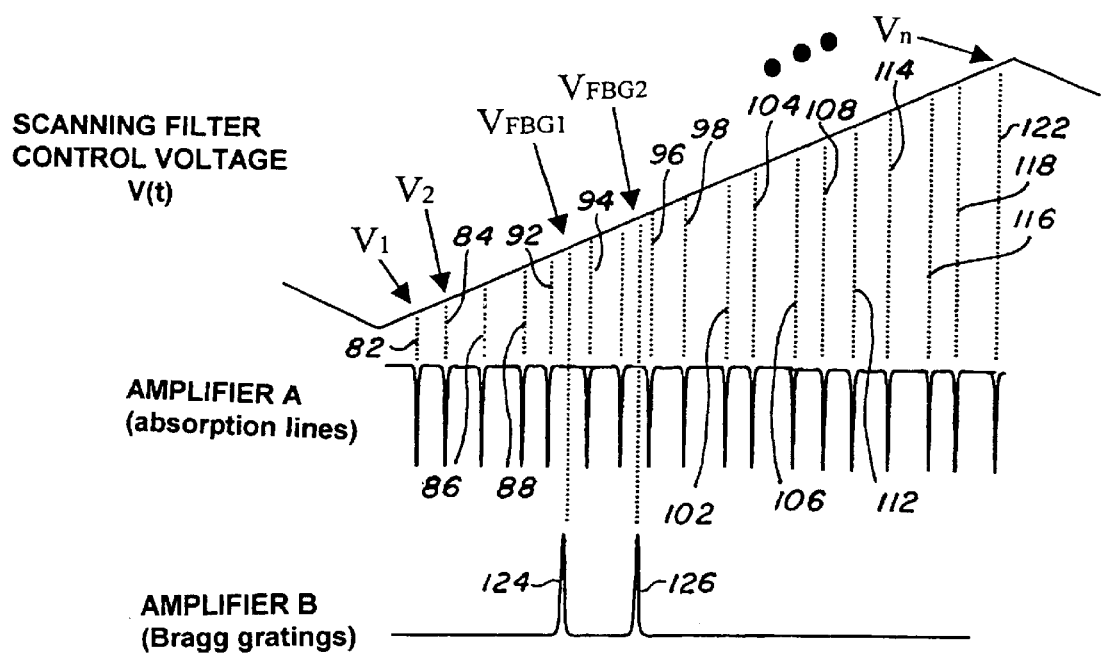
FIG. 2c shows a series of dips in voltage on amplifier A indicating absorption lines at different scanning voltage values ($V_1$ to $V_n$)(different passband wavelengths) and peaks in voltage ($V_{FBG1}$ and $V_{FBG2}$) on amplifier B corresponding to gratings at two different wavelengths.

To use the absorption cell 66 as a wavelength reference and filter calibration tool in fiber Bragg grating applications, photodetector A 36 sees a transmission spectrum of the absorption cell 66 while photodetector B 78 sees the Bragg grating reflections from the sensing array 82. Similar to the teachings of the first preferred embodiment 10, the filter drive voltages $V_1$ 82 through $V_n$ 122, as shown in FIG. 2c, that coincide with the location of dips in the transmission spectrum (at known wavelengths) are used to calibrate the voltage-to-wavelength function of the scanning filter 28. As opposed to the dual-substrate Bragg grating calibration taught in the first preferred embodiment 10, this embodiment 20 has no temperature compensation step because the absorption lines are not temperature sensitive. The sensing grating 82 wavelengths are estimated from the voltages at their peak values, $V_{FBG1}$ 124 and $V_{FBG2}$ 126, as shown in FIG. 2c, and the calibration function.

Both embodiments 10 and 20, may be applied to tunable filters other than the fiber Fabry-Perot filters taught herein. Additionally, the placement of the filter 28 and sensing array 82 may vary in their placement in the optical system, for example the sensing array 82 may be placed in series with the gas cell 66 or dual-substrate grating array 16 and 22.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed:

1. A passive, temperature compensated tunable filter calibration device in a Bragg-grating interrogation system comprised of:

a calibration and reference device further comprised of an array of Bragg gratings bonded to a first host substrate and a single grating bonded to a second host substrate having a different linear coefficient of thermal expansion from that of the first host substrate;

a plurality of gratings contained in an optical fiber forming a sensing array;

a filter for filtering a broadband optical light so that at any point in time only a narrow band of light is present in the gratings containing fibers connected to the filter;

a power source for applying a predetermined drive voltage to the scanning filter to produce a scanning filter control voltage;

a first photodetector for receiving optical light reflected back from the calibration and reference device and converting the optical light to an electrical signal;

a second photodetector for receiving light reflected from the sensing array an converting it to an electrical signal;

amplifiers associated with each electrical signal amplifying the electrical signal representing the reflected light so as to show a series of peaks corresponding to the gratings in the array from the lowest to the highest wavelength as the drive voltage is increased; and processing electronics for receiving the amplified electrical signals and calculating a voltage-to-wavelength function for the scanning range of the filter.

2. A passive, temperature compensated tunable filter calibration device in a Bragg-grating interrogation system comprised of:

a calibration and reference device further comprised of an array of Bragg gratings bonded to a first host substrate and a single grating bonded to a second host substrate having a different linear coefficient of thermal expansion from that of the first host substrate;

a plurality of gratings contained in an optical fiber forming a sensing array;

a filter for filtering a broadband optical light so that at any point in time only a narrow band of light is present in the gratings containing fibers connected to the filter;

a power source for applying a predetermined drive voltage to the scanning filter to produce a scanning filter control voltage;

a first means for receiving optical light reflected back from the calibration and reference device and converting the optical light to an electrical signal;

a second means for receiving light reflected from the sensing array an converting it to an electrical signal;

amplifiers associated with each electrical signal amplifying the electrical signal representing the reflected light so as to show a series of peaks corresponding to the gratings in the array from the lowest to the highest wavelength as the drive voltage is increased; and processing electronics for receiving the amplified electrical signals and calculating a voltage-to-wavelength function for the scanning range of the filter.

3. A device, as in claim 1, wherein the processing electronics is a computer.

4. A device, as in claim 1, wherein the processing electronics are an electrical circuit.

* * * * *